United States Patent [19]

Fujita et al.

[11] Patent Number: 4,711,734

[45] Date of Patent: Dec. 8, 1987

[54] OILY PHASE DISPERSIONS EMPLOYING AN OIL-MISCIBLE DISPERSING AGENT

[75] Inventors: Takeshi Fujita, Kyoto; Hironori Kataoka, Yamatokoriyama, both of Japan

[73] Assignee: Dai-Ichi Kogyo Seiyaku Co., Ltd., Kyoto, Japan

[21] Appl. No.: 409,262

[22] Filed: Aug. 18, 1982

[51] Int. Cl.$^4$ ............... C10M 129/16; C10M 129/18

[52] U.S. Cl. ........................ 252/52 A; 252/51.5 R; 252/58; 252/56 R; 252/28; 252/25

[58] Field of Search ................ 252/52 A, 58, 51.5 R

[56] References Cited

U.S. PATENT DOCUMENTS

| | | | |
|---|---|---|---|
| 2,522,155 | 9/1950 | Ballard et al. | 252/52 A X |
| 2,819,278 | 1/1958 | De Groote et al. | 252/51.5 A X |
| 3,194,762 | 7/1965 | Browning et al. | 252/58 X |
| 3,247,116 | 4/1966 | Reiling | 252/58 |
| 3,806,455 | 4/1974 | Siegart et al. | 252/51.5 A X |
| 4,302,349 | 11/1981 | Kosswig et al. | 252/52 A X |
| 4,409,000 | 10/1983 | Lesuer | 252/51.5 R X |

Primary Examiner—Jacqueline V. Howard

Attorney, Agent, or Firm—Millen & White

[57] ABSTRACT

Uniform dispersions of oil insoluble substances in the oil phase are produced employing as an oil-miscible dispersing agent, a reaction product of a compound having a molecular weight of at least 1,000 and being represented by the formula:

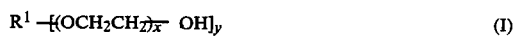

(I)

wherein $R^1$ is an organic bridging group, x is an integer greater than 1, and y is an integer from 2 to 8, and a compound of the formula:

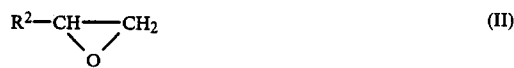

(II)

wherein $R^2$ is a $C_6$–$C_{40}$ alkyl or phenyl, the molar ratio of compound (II) to compound (I) being at least 1 alone or a mixture thereof with 10–90% by weight of the mixture of a lanolin fatty acid ester.

16 Claims, No Drawings

OILY PHASE DISPERSIONS EMPLOYING AN OIL-MISCIBLE DISPERSING AGENT

BACKGROUND OF THE INVENTION

This invention relates to novel oil phase dispersions comprising an oil insoluble substance and an oil-miscible dispersing agent and to their production.

A variety of surface active agents have been known and used in many fields depending upon their properties as, for example, dispersing agents, emulsifiers, detergents, wetting agents, softening agents and the like. However, a satisfactory dispersing agent which is miscible with oils and useful for dispersing an oil-insoluble substance in oily phase has not been discovered yet. Therefore, there exists a strong need for such oil-miscible dispersing agents.

For example, fluorocarbon resin particles are added to lubricant oils to improve their properties. Because of difference in specific gravities between fluorocarbon resin (about 2.3) and lubricants (about 0.8) and of relatively low viscosity of oils (about 50–100 cps, at 25° C.), the fluorocarbon resin particles tend to deposit within one day.

As a further example, a quantity of fine silica powder is added to a coating composition when a mat finish is desired. Furthermore, magnesium hydroxide particles are added to fuel oils (bunker oils) to minimize damages to boilers and other burning equipments. For such uses there exists a need for an effective dispersing agent which is capable of dispersing an oil-insoluble substance in an oily phase as a stable dispersion.

It is therefore, a principal object of the present invention to provide an oil-miscible dispersing agent which can meet the above need.

Other objects and advantages of the present invention will become apparent as the description proceeds.

DESCRIPTION OF THE INVENTION

According to the present invention, there is provided oily phase dispersions of an oil insoluble substance comprising an oil-miscible dispersing agent consisting essentially of a reaction product of a compound having a molecular weight of at least 1,000 and being represented by the formula:

wherein $R^1$ is an organic bridging group, x is an integer greater than 1, and y is an integer from 2 to 8, and a compound of the formula:

wherein $R^2$ is a $C_6$–$C_{40}$ alkyl or phenyl, the molar ratio of compound (II) to compound (I) being at least 1.

The compound (I) may be prepared by reacting in per se known manner a starting active hydrogen compound of the formula $R^1(H)_y$, wherein $R^1$ and y are as defined, with ethylene oxide. Examples of active hydrogen compounds include polyols such as ethylene glycol, propylene glycol, polyethylene glycol, glycerine, trimethylolpropane, pentaerythritol, dipentaerythritol, diglycerine, sorbitol, sucrose, triethanolamine, triisopropanolamine and the like; and polyamines such as ethylenediamine.

The molecular weight of compound (I) should be at least 1,000 and is preferably from 1,000 to 27,000.

Examples of compound (II) include styrene oxide, 1,2-epoxyoctane, 1,2-epoxydecane, 1,2-epoxydodecane, 1,2-epoxyhexadecane, 1,2-epoxyoctadecane, 1,2-epoxyeicosane, 1,2-epoxytriacontane, 1,2-epoxytetracontane and the like. Mixtures of these compounds may also be used.

The dispersing agent of the present invention may be prepared by reacting one mole of compound (I) with at least one mole of compound (II) in the presence of an alkali catalyst such as sodium hydroxide, potassium hydroxide, sodium carbonate, potassium carbonate and potassium alcoholate (I) at a temperature of 100°–180° C. with stirring for at least 3 hours. Alternatively, the reaction may be carried out in the presence of an acid catalyst such as hydrochloric acid, sulfuric acid, phosphoric acid and the like at a temperature of 30°–70° C. with stirring for at least 1 hour. After the reaction, the alkali or acid catalyst may be removed by neutralization or other suitable technique.

The molar ratio of compound (II) to compound (I) should be at least 1 and is preferably 2–50.

The resultant adduct of compound (I) with compound (II) is capable of dispersing particles of an oil-insoluble substance in an oily phase to form a very stable dispersion when used alone or in combination with one or more known oil-miscible dispersing agents.

Particularly, lanolin fatty acid esters have been found effective to combine with the dispersing agent of the present invention.

As is well-known, lanolin fatty acid may be obtained by saponifying wool grease and typically has the following content:

TABLE I

Lanolin Fatty Acids Content:
(E. V. Truter in J. Soc. Cosm. Chem., 1962)

| Fatty acids content | Carbon number | Content, % |
|---|---|---|
| Normal fatty acids | $C_{10}$–$C_{32}$ even numbers | } 7 |
| Normal fatty acids | $C_{13}$–$C_{17}$ odd numbers | |
| Iso-fatty acids | $C_{10}$–$C_{32}$ even numbers | 23 |
| Anti-iso fatty acids | $C_9$–$C_{31}$ odd numbers | 30 |
| α-hydroxyl-normal fatty acids | $C_{12}$–$C_{24}$ even numbers | } 15 |
| α-hydroxyl-normal fatty acids | $C_{11}$–$C_{23}$ odd numbers | |
| α-hydroxyl-iso fatty acids | $C_{14}$–$C_{24}$ even numbers | 11 |
| α-hydroxyl-anti-iso F.A. | $C_{13}$–$C_{25}$ odd numbers | 4 |
| ω-hydroxyl-normal F.A. | $C_{26}$–$C_{34}$ even numbers | 3 |
| ω-hydroxyl-iso F.A. | $C_{30}$–$C_{32}$ even numbers | 0.5 |
| ω-hydroxyl-anti-iso F.A. | $C_{27}$–$C_{33}$ odd numbers | 1 |
| Total of confirmed F.A. | | 94.5 |
| Unconfirmed contents | | 5.5 |

Lanolin fatty acid esters which may be used in combination with the adduct of compound (I) and compound (II) may be prepared by esterfying lanolin fatty acid with a fatty alcohol such as lauryl alcohol or a polyol such as ethylene glycol, diethylene glycol, propylene glycol, glycerine, diglycerine, sorbitol, sucrose and the like. The degree of esterification is preferably greater than 10% relative to fatty acid content although it is not critical. The weight ratio of the adduct of compound (I) with compound (II) to lanolin fatty acid esters ranges from 1:9 to 9:1.

To further illustrate the invention, the following examples are presented. Unless otherwise indicated all parts and percentages are by weight.

EXAMPLE 1

Preparation of adduct of compound (I) and compound (II)

An active hydrogen compound and ethylene oxide were reacted by the above-mentioned method to obtain various compounds of the formula (I) shown in Table II. The resulting compound (I) was then reacted with compound (II) as shown in Table II by the above-mentioned method to obtain their adduct.

Materials and their proportions are shown in Table II.

TABLE II

| Adduct | Compound (I) | | | Compound (II) | |
|---|---|---|---|---|---|
| | Active hydrogen compound | Ethylene oxide added, mole | M.W. of compound (I) | Name | Molar ratio to compound (I) |
| A-1  | ethylene glycol | 19 | 898 | — | — |
| A-2  | " | " | " | 1,2-epoxyoctane | 2 |
| A-3  | " | " | " | " | 4 |
| A-4  | " | " | " | " | 6 |
| A-5  | " | " | " | 1,2-epoxytetracontane | 2 |
| A-6  | " | " | " | 1,2-epoxytetracontane | 4 |
| A-7  | " | " | " | 1,2-epoxytetracontane | 6 |
| A-8  | " | 29 | 1338 | — | — |
| A-9  | " | " | " | 1,2-epoxyoctane | 2 |
| A-10 | " | " | " | " | 4 |
| A-11 | " | " | " | 1,2-epoxyeicosane | 2 |
| A-12 | " | " | " | " | 4 |
| A-13 | " | 39 | 1778 | — | — |
| A-14 | " | " | " | 1,2-epoxyoctane | 2 |
| A-15 | " | " | " | " | 4 |
| A-16 | " | " | " | 1,2-epoxytetracontane | 2 |
| A-17 | " | " | " | 1,2-epoxytetracontane | 4 |
| A-18 | " | 49 | 2218 | — | — |
| A-19 | " | " | " | 1,2-epoxyoctane | 2 |
| A-20 | " | " | " | " | 4 |
| A-21 | " | 99 | 4418 | — | — |
| A-22 | " | " | " | 1,2-epoxyoctane | 2 |
| A-23 | " | " | " | " | 4 |
| A-24 | " | 199 | 8818 | — | — |
| A-25 | " | " | " | 1,2-epoxyeicosane | 2 |
| A-26 | " | " | " | " | 4 |
| A-27 | " | " | " | " | 6 |
| A-28 | " | 299 | 13218 | — | — |
| A-29 | " | " | " | 1,2-epoxytetracontane | 2 |
| A-30 | " | " | " | 1,2-epoxytetracontane | 4 |
| A-31 | " | " | " | 1,2-epoxytetracontane | 6 |
| A-32 | " | 599 | 26418 | — | — |
| A-33 | " | " | " | 1,2-epoxytetracontane | 2 |
| A-34 | " | " | " | 1,2-epoxytetracontane | 4 |
| A-35 | " | " | " | 1,2-epoxytetracontane | 6 |
| B-1  | diglycerine | 16 | 870 | — | — |
| B-2  | " | " | " | 1,2-epoxyoctane | 2 |
| B-3  | " | " | " | " | 6 |
| B-4  | " | " | " | " | 10 |
| B-5  | " | " | " | 1,2-epoxytetracontane | 2 |
| B-6  | " | " | " | 1,2-epoxytetracontane | 6 |
| B-7  | " | " | " | 1,2-epoxytetracontane | 10 |
| B-8  | " | 20 | 1046 | — | — |
| B-9  | " | " | " | 1,2-epoxyoctane | 5 |
| B-10 | " | " | " | " | 10 |
| B-11 | " | " | " | 1,2-epoxytetracontane | 5 |
| B-12 | " | " | " | 1,2-epoxytetracontane | 10 |
| B-13 | " | 32 | 1574 | — | — |
| B-14 | " | " | " | 1,2-epoxyoctane | 2 |
| B-15 | " | " | " | " | 4 |
| B-16 | " | " | " | 1,2-epoxytetracontane | 2 |
| B-17 | " | " | " | 1,2-epoxytetracontane | 4 |
| B-18 | " | 40 | 1926 | — | — |

TABLE II-continued

| Adduct | Compound (I) Active hydrogen compound | Compound (I) Ethylene oxide added, mole | Compound (I) M.W. of compound (I) | Compound (II) Name | Compound (II) Molar ratio to compound (I) |
|---|---|---|---|---|---|
| B-19 | " | " | " | 1,2-epoxytetra-contane | 2 |
| B-20 | " | " | " | 1,2-epoxytetra-contane | 4 |
| B-21 | " | 120 | 5446 | — | — |
| B-22 | " | " | " | 1,2-epoxyoctane | 2 |
| B-23 | " | " | " | " | 4 |
| B-24 | " | " | " | 1,2-epoxytetra-contane | 2 |
| B-25 | " | " | " | 1,2-epoxytetra-contane | 4 |
| B-26 | " | 160 | 7206 | — | — |
| B-27 | " | " | " | 1,2-epoxyoctane | 5 |
| B-28 | " | " | " | " | 10 |
| B-29 | " | " | " | 1,2-epoxytetra-contane | 5 |
| B-30 | " | " | " | 1,2-epoxytetra-contane | 10 |
| C-1 | sucrose | 8 | 694 | — | — |
| C-2 | " | " | " | 1,2-epoxyoctane | 10 |
| C-3 | " | " | " | " | 20 |
| C-4 | " | " | " | " | 30 |
| C-5 | " | " | " | 1,2-epoxyeicosan | 10 |
| C-6 | " | " | " | " | 20 |
| C-7 | " | " | " | " | 30 |
| C-8 | " | 16 | 1046 | — | — |
| C-9 | " | " | " | 1,2-epoxyoctane | 10 |
| C-10 | " | " | " | " | 20 |
| C-11 | " | " | " | " | 30 |
| C-12 | " | " | " | 1,2-epoxyeicosan | 10 |
| C-13 | " | " | " | 1,2-epoxyeicosane | 20 |
| C-14 | " | " | " | " | 30 |
| C-15 | " | " | " | 1,2-epoxytetra-contane | 10 |
| C-16 | " | " | " | 1,2-epoxytetra-contane | 20 |
| C-17 | " | " | " | 1,2-epoxytetra-contane | 30 |
| C-18 | " | 32 | 1750 | — | — |
| C-19 | " | " | " | 1,2-epoxyoctane | 20 |
| C-20 | " | " | " | " | 40 |
| C-21 | " | " | " | 1,2-epoxyeicosane | 20 |
| C-22 | " | " | " | " | 40 |
| C-23 | " | 48 | 2454 | — | — |
| C-24 | " | " | " | 1,2-epoxyoctane | 20 |
| C-25 | " | " | " | " | 30 |
| C-26 | " | " | " | 1,2-epoxytetra-contane | 20 |
| C-27 | " | " | " | 1,2-epoxytetra-contane | 30 |
| C-28 | " | 80 | 3862 | — | — |
| C-29 | " | " | " | 1,2-epoxyoctane | 20 |
| C-30 | " | " | " | " | 30 |
| C-31 | " | " | " | 1,2-epoxytetra-contane | 20 |
| C-32 | " | " | " | 1,2-epoxytetra-contane | 30 |

EXAMPLE 2

Preparation of lanolin fatty acid esters

Lanolin fatty acid was esterified by the conventional method with a polyol to obtain the following esters:

| Lanolin fatty acid ester | Polyol | Degree of esterification, % |
|---|---|---|
| D-1 | ethylene glycol | 45 |
| D-2 | propylene glycol | 70 |
| D-3 | glycerine | 35 |
| D-4 | sorbitol | 18 |

EXAMPLE 3

Dispersion of fluorocarbon resin in lubricant

| | |
|---|---|
| Lubricant (spindle oil) | 98% |
| Fluorocarbon resin powder | 1% |
| Dispersing agent | 1% |
| Total | 100% |

The above formulation was vigorously stirred to obtain a dispersion. 100 ml of the dispersion was placed in a graduated cylinder and allowed to stand for a period time at 25° C. The degree of sedimentation of resin powder was visually judged at predetermined intervals.

The results are shown in Table III in which symbols have the following meaning.
++: No deposit.
+: A small amount of deposits.
−: A large amount of deposits.

TABLE III

| Dispersing agent | Stability upon standing at 25° C. | | | | |
|---|---|---|---|---|---|
| | 1 day | 20 days | 40 days | 60 days | 80 days |
| The present invention: | | | | | |
| A-9 | ++ | ++ | ++ | ++ | ++ |
| A-10 | ++ | ++ | ++ | ++ | ++ |
| A-11 | ++ | ++ | ++ | ++ | ++ |
| A-12 | ++ | ++ | ++ | ++ | ++ |
| A-14 | ++ | ++ | ++ | ++ | ++ |
| A-15 | ++ | ++ | ++ | ++ | ++ |
| A-16 | ++ | ++ | ++ | ++ | ++ |
| A-17 | ++ | ++ | ++ | ++ | ++ |
| A-19 | ++ | ++ | ++ | ++ | ++ |
| A-20 | ++ | ++ | ++ | ++ | ++ |
| A-22 | ++ | ++ | ++ | ++ | ++ |
| A-23 | ++ | ++ | ++ | ++ | ++ |
| A-25 | ++ | ++ | ++ | ++ | ++ |
| A-26 | ++ | ++ | ++ | ++ | ++ |
| A-27 | ++ | ++ | ++ | ++ | ++ |
| A-29 | ++ | ++ | ++ | ++ | ++ |
| A-30 | ++ | ++ | ++ | ++ | ++ |
| A-31 | ++ | ++ | ++ | ++ | ++ |
| A-33 | ++ | ++ | ++ | ++ | ++ |
| A-34 | ++ | ++ | ++ | ++ | ++ |
| A-35 | ++ | ++ | ++ | ++ | ++ |
| Comparative example: | | | | | |
| A-1 | − | − | − | − | − |
| A-2 | ++ | − | − | − | − |
| A-3 | ++ | ++ | − | − | − |
| A-4 | ++ | ++ | ++ | + | − |
| A-5 | ++ | ++ | − | − | − |
| A-6 | ++ | ++ | − | − | − |
| A-7 | ++ | ++ | ++ | + | − |
| A-8 | − | − | − | − | − |
| A-13 | − | − | − | − | − |
| A-18 | − | − | − | − | − |
| A-21 | − | − | − | − | − |
| A-24 | − | − | − | − | − |
| A-28 | − | − | − | − | − |
| A-32 | − | − | − | − | − |
| The present invention: | | | | | |
| A-9:D-1 = 7:3 | ++ | ++ | ++ | ++ | ++ |
| A-9:D-1 = 5:5 | ++ | ++ | ++ | ++ | ++ |
| A-9:D-1 = 3:7 | ++ | ++ | ++ | ++ | ++ |
| A-10:D-1 = 7:3 | ++ | ++ | ++ | ++ | ++ |
| A-10:D-1 = 5:5 | ++ | ++ | ++ | ++ | ++ |
| A-10:D-1 = 3:7 | ++ | ++ | ++ | ++ | ++ |
| A-11:D-1 = 7:3 | ++ | ++ | ++ | ++ | ++ |
| A-11:D-1 = 5:5 | ++ | ++ | ++ | ++ | ++ |
| A-11:D-1 = 3:7 | ++ | ++ | ++ | ++ | ++ |
| A-12:D-1 = 9:1 | ++ | ++ | ++ | ++ | ++ |
| A-12:D-1 = 5:5 | ++ | ++ | ++ | ++ | ++ |
| A-12:D-1 = 1:9 | ++ | ++ | ++ | ++ | ++ |
| A-14:D-2 = 9:1 | ++ | ++ | ++ | ++ | ++ |
| A-14:D-2 = 5:5 | ++ | ++ | ++ | ++ | ++ |
| A-14:D-2 = 1:9 | ++ | ++ | ++ | ++ | ++ |
| A-15:D-2 = 9:1 | ++ | ++ | ++ | ++ | ++ |
| A-15:D-2 = 5:5 | ++ | ++ | ++ | ++ | ++ |
| A-15:D-2 = 1:9 | ++ | ++ | ++ | ++ | ++ |
| A-16:D-2 = 7:3 | ++ | ++ | ++ | ++ | ++ |
| A-16:D-2 = 5:5 | ++ | ++ | ++ | ++ | ++ |
| A-16:D-2 = 3:7 | ++ | ++ | ++ | ++ | ++ |
| A-17:D-2 = 7:3 | ++ | ++ | ++ | ++ | ++ |
| A-17:D-2 = 5:5 | ++ | ++ | ++ | ++ | ++ |
| A-17:D-2 = 3:7 | ++ | ++ | ++ | ++ | ++ |
| A-19:D-3 = 7:3 | ++ | ++ | ++ | ++ | ++ |
| A-19:D-3 = 5:5 | ++ | ++ | ++ | ++ | ++ |
| A-19:D-3 = 3:7 | ++ | ++ | ++ | ++ | ++ |
| A-20:D-3 = 7:3 | ++ | ++ | ++ | ++ | ++ |
| A-20:D-3 = 5:5 | ++ | ++ | ++ | ++ | ++ |
| A-20:D-3 = 3:7 | ++ | ++ | ++ | ++ | ++ |
| A-22:D-3 = 7:3 | ++ | ++ | ++ | ++ | ++ |
| A-22:D-3 = 5:5 | ++ | ++ | ++ | ++ | ++ |
| A-22:D-3 = 3:7 | ++ | ++ | ++ | ++ | ++ |
| A-23:D-4 = 9:1 | ++ | ++ | ++ | ++ | ++ |

TABLE III-continued

| Dispersing agent | Stability upon standing at 25° C. | | | | |
|---|---|---|---|---|---|
| | 1 day | 20 days | 40 days | 60 days | 80 days |
| A-23:D-4 = 5:5 | ++ | ++ | ++ | ++ | ++ |
| A-23:D-4 = 1:9 | ++ | ++ | ++ | ++ | ++ |
| A-25:D-4 = 9:1 | ++ | ++ | ++ | ++ | ++ |
| A-25:D-4 = 5:5 | ++ | ++ | ++ | ++ | ++ |
| A-25:D-4 = 1:9 | ++ | ++ | ++ | ++ | ++ |
| A-26:D-4 = 9:1 | ++ | ++ | ++ | ++ | ++ |
| A-26:D-4 = 5:5 | ++ | ++ | ++ | ++ | ++ |
| A-26:D-4 = 1:9 | ++ | ++ | ++ | ++ | ++ |
| A-27:D-1 = 5:5 | ++ | ++ | ++ | ++ | ++ |
| A-27:D-2 = 5:5 | ++ | ++ | ++ | ++ | ++ |
| A-27:D-3 = 5:5 | ++ | ++ | ++ | ++ | ++ |
| A-27:D-4 = 5:5 | ++ | ++ | ++ | ++ | ++ |
| A-29:D-1 = 5:5 | ++ | ++ | ++ | ++ | ++ |
| A-29:D-2 = 5:5 | ++ | ++ | ++ | ++ | ++ |
| A-29:D-3 = 5:5 | ++ | ++ | ++ | ++ | ++ |
| A-29:D-4 = 5:5 | ++ | ++ | ++ | ++ | ++ |
| A-30:D-1 = 5:5 | ++ | ++ | ++ | ++ | ++ |
| A-30:D-2 = 5:5 | ++ | ++ | ++ | ++ | ++ |
| A-30:D-3 = 5:5 | ++ | ++ | ++ | ++ | ++ |
| A-30:D-4 = 5:5 | ++ | ++ | ++ | ++ | ++ |
| A-31:D-1 = 5:5 | ++ | ++ | ++ | ++ | ++ |
| A-31:D-2 = 5:5 | ++ | ++ | ++ | ++ | ++ |
| A-31:D-3 = 5:5 | ++ | ++ | ++ | ++ | ++ |
| A-33:D-2 = 5:5 | ++ | ++ | ++ | ++ | ++ |
| A-33:D-3 = 5:5 | ++ | ++ | ++ | ++ | ++ |
| A-33:D-4 = 5:5 | ++ | ++ | ++ | ++ | ++ |
| A-34:D-1 = 5:5 | ++ | ++ | ++ | ++ | ++ |
| A-34:D-2 = 5:5 | ++ | ++ | ++ | ++ | ++ |
| A-34:D-3 = 5:5 | ++ | ++ | ++ | ++ | ++ |
| A-35:D-1 = 5:5 | ++ | ++ | ++ | ++ | ++ |
| A-35:D-2 = 5:5 | ++ | ++ | ++ | ++ | ++ |
| A-35:D-3 = 5:5 | ++ | ++ | ++ | ++ | ++ |
| A-35:D-4 = 5:5 | ++ | ++ | ++ | ++ | ++ |
| Comparative example: | | | | | |
| A-1:D-1 = 5:5 | − | − | − | − | − |
| A-2:D-2 = 5:5 | ++ | − | − | − | − |
| A-3:D-3 = 5:5 | ++ | − | − | − | − |
| A-4:D-4 = 5:5 | ++ | ++ | + | − | − |
| A-5:D-1 = 5:5 | ++ | − | − | − | − |
| A-6:D-2 = 5:5 | ++ | − | − | − | − |
| A-7:D-3 = 5:5 | ++ | ++ | + | − | − |
| A-8:D-4 = 5:5 | − | − | − | − | − |
| A-13:D-1 = 5:5 | − | − | − | − | − |
| A-18:D-2 = 5:5 | − | − | − | − | − |
| A-21:D-3 = 5:5 | − | − | − | − | − |
| A-24:D-4 = 5:5 | − | − | − | − | − |
| A-28:D-4 = 5:5 | − | − | − | − | − |
| A-32:D-4 = 5:5 | − | − | − | − | − |

EXAMPLE 4

| Dispersion of SiO₂ in oily coating composition | |
|---|---|
| Acrylic polymer (non-volatile 50%) | 20% |
| TiO₂ | 35% |
| Xylene | 25% |
| Butanol | 14% |
| SiO₂ | 5% |
| Dispersing agent | 1% |
| Total | 100% |

The above formulation was thoroughly mixed and allowed to stand for 1 hour. About one tenth portion was withdrawn from the upper portion of the composition, applied on a glass plate and dried at 105° C. for 30 minutes.

60° gloss of the resulting mat finish coating film was measured by a glossmeter.

The above procedure was repeated after standing the coating composition for a period of time at 25° C.

The results obtained are shown in Table IV in which the value of 60° gloss is inversely proportional to the degree of sedimentation of SiO₂.

TABLE IV

| Dispersing agent | 60° gloss 0 day | 30 days | 60 days | Overall stability |
|---|---|---|---|---|
| The present invention: | | | | |
| B-9 | 52 | 52 | 52 | ++ |
| B-10 | 51 | 50 | 51 | ++ |
| B-11 | 50 | 50 | 50 | ++ |
| B-12 | 50 | 50 | 50 | ++ |
| B-14 | 50 | 50 | 49 | ++ |
| B-15 | 50 | 50 | 50 | ++ |
| B-16 | 50 | 51 | 50 | ++ |
| B-17 | 50 | 50 | 50 | ++ |
| B-19 | 50 | 50 | 50 | ++ |
| B-20 | 50 | 50 | 50 | ++ |
| B-22 | 52 | 53 | 55 | ++ |
| B-23 | 51 | 52 | 54 | ++ |
| B-24 | 52 | 54 | 55 | ++ |
| B-25 | 50 | 51 | 53 | ++ |
| B-27 | 54 | 56 | 58 | ++ |
| B-28 | 53 | 55 | 58 | ++ |
| B-29 | 53 | 56 | 57 | ++ |
| B-30 | 52 | 55 | 57 | ++ |
| Comparative Example: | | | | |
| B-1 | 98 | 98 | 98 | — |
| B-2 | 62 | 74 | 79 | — |
| B-3 | 57 | 57 | 65 | — |
| B-4 | 53 | 58 | 66 | — |
| B-5 | 59 | 62 | 69 | — |
| B-6 | 58 | 64 | 70 | — |
| B-7 | 59 | 66 | 73 | — |
| B-8 | 97 | 98 | 97 | — |
| B-13 | 98 | 98 | 97 | — |
| B-18 | 98 | 98 | 96 | — |
| B-21 | 98 | 98 | 98 | — |
| B-26 | 98 | 98 | 98 | — |
| The present invention: | | | | |
| B-9:D-1 = 7:3 | 50 | 50 | 50 | ++ |
| B-9:D-1 = 5:5 | 49 | 49 | 50 | ++ |
| B-9:D-1 = 3:7 | 50 | 50 | 50 | ++ |
| B-10:D-1 = 7:3 | 49 | 49 | 49 | ++ |
| B-10:D-1 = 5:5 | 50 | 51 | 51 | ++ |
| B-10:D-1 = 3:7 | 51 | 51 | 51 | ++ |
| B-11:D-1 = 7:3 | 51 | 50 | 50 | ++ |
| B-11:D-1 = 5:5 | 50 | 50 | 50 | ++ |
| B-11:D-1 = 3:7 | 50 | 50 | 50 | ++ |
| B-12:D-1 = 9:1 | 50 | 50 | 51 | ++ |
| B-12:D-1 = 5:5 | 51 | 51 | 52 | ++ |
| B-12:D-1 = 1:9 | 50 | 51 | 51 | ++ |
| B-14:D-2 = 9:1 | 52 | 54 | 55 | ++ |
| B-14:D-2 = 5:5 | 50 | 52 | 53 | ++ |
| B-14:D-2 = 1:9 | 50 | 51 | 50 | ++ |
| B-15:D-2 = 9:1 | 52 | 53 | 53 | ++ |
| B-15:D-2 = 5:5 | 50 | 50 | 50 | ++ |
| B-15:D-2 = 1:9 | 53 | 53 | 54 | ++ |
| B-16:D-2 = 7:3 | 50 | 51 | 52 | ++ |
| B-16:D-2 = 5:5 | 51 | 51 | 51 | ++ |
| B-16:D-2 = 3:7 | 53 | 53 | 54 | ++ |
| B-17:D-2 = 7:3 | 51 | 51 | 52 | ++ |
| B-17:D-2 = 5:5 | 50 | 50 | 52 | ++ |
| B-17:D-2 = 3:7 | 51 | 51 | 51 | ++ |
| B-19:D-3 = 7:3 | 52 | 53 | 55 | ++ |
| B-19:D-3 = 5:5 | 50 | 50 | 50 | ++ |
| B-19:D-3 = 3:7 | 51 | 52 | 54 | ++ |
| B-20:D-3 = 7:3 | 50 | 51 | 51 | ++ |
| B-20:D-3 = 5:5 | 49 | 49 | 50 | ++ |
| B-20:D-3 = 3:7 | 50 | 50 | 51 | ++ |
| B-22:D-3 = 7:3 | 51 | 51 | 53 | ++ |
| B-22:D-3 = 5:5 | 50 | 50 | 51 | ++ |
| B-22:D-3 = 3:7 | 50 | 51 | 51 | ++ |
| B-23:D-4 = 9:1 | 50 | 51 | 51 | ++ |
| B-23:D-4 = 5:5 | 49 | 49 | 49 | ++ |
| B-23:D-4 = 1:9 | 50 | 50 | 50 | ++ |
| B-24:D-4 = 9:1 | 53 | 56 | 55 | ++ |
| B-24:D-4 = 5:5 | 54 | 56 | 58 | ++ |
| B-24:D-4 = 1:9 | 52 | 55 | 57 | ++ |
| B-25:D-4 = 9:1 | 51 | 52 | 54 | ++ |
| B-25:D-4 = 5:5 | 51 | 50 | 51 | ++ |
| B-25:D-4 = 1:9 | 50 | 50 | 51 | ++ |
| B-27:D-1 = 5:5 | 54 | 54 | 55 | ++ |
| B-27:D-2 = 5:5 | 53 | 53 | 53 | ++ |
| B-27:D-3 = 5:5 | 52 | 52 | 53 | ++ |
| B-27:D-4 = 5:5 | 50 | 50 | 52 | ++ |
| B-28:D-2 = 5:5 | 52 | 52 | 51 | ++ |
| B-28:D-3 = 5:5 | 52 | 52 | 52 | ++ |
| B-28:D-4 = 5:5 | 51 | 50 | 52 | ++ |
| B-29:D-1 = 5:5 | 48 | 49 | 49 | ++ |
| B-29:D-2 = 5:5 | 53 | 55 | 56 | ++ |
| B-29:D-3 = 5:5 | 54 | 55 | 57 | ++ |
| B-30:D-1 = 5:5 | 52 | 53 | 55 | ++ |
| B-30:D-2 = 5:5 | 51 | 51 | 53 | ++ |
| B-30:D-3 = 5:5 | 52 | 52 | 54 | ++ |
| Comparative Example: | | | | |
| B-1:D-1 = 5:5 | 95 | 96 | 98 | — |
| B-2:D-2 = 5:5 | 60 | 62 | 74 | — |
| B-3:D-3 = 5:5 | 54 | 57 | 65 | — |
| B-4:D-4 = 5:5 | 55 | 62 | 70 | — |
| B-5:D-1 = 5:5 | 56 | 67 | 70 | — |
| B-6:D-2 = 5:5 | 59 | 68 | 78 | — |
| B-7:D-3 = 5:5 | 55 | 59 | 67 | — |
| B-8:D-4 = 5:5 | 50 | 56 | 66 | — |
| B-13:D-1 = 5:5 | 55 | 62 | 74 | — |
| B-18:D-2 = 5:5 | 54 | 61 | 73 | — |
| B-21:D-3 = 5:5 | 56 | 67 | 76 | — |
| B-26:D-4 = 5:5 | 55 | 64 | 79 | — |

EXAMPLE 5

| Dispersion of magnesium hydroxide in bunker oil | |
|---|---|
| Bunker A | 78% |
| Magnesium hydroxide | 20% |
| Dispersing agent | 2% |
| Total | 100% |

The above formulation was vigorously stirred to obtain a homogenous dispersion. 100 ml of the dispersion was placed in a graduated cylinder and allowed to stand for a period of time at 25° C. The degree of sedimentation of magnesium hydroxide was visually judged at predetermined intervals as in Example 3.

The results obtained are shown in Table V.

TABLE V

| Dispersing agent | Stability upon standing at 25° C. | | | | |
|---|---|---|---|---|---|
| | 1 day | 7 days | 21 days | 40 days | 60 days |
| The present invention: | | | | | |
| C-9 | ++ | ++ | ++ | ++ | ++ |
| C-10 | ++ | ++ | ++ | ++ | ++ |
| C-11 | ++ | ++ | ++ | ++ | ++ |
| C-12 | ++ | ++ | ++ | ++ | ++ |
| C-13 | ++ | ++ | ++ | ++ | ++ |
| C-14 | ++ | ++ | ++ | ++ | ++ |
| C-15 | ++ | ++ | ++ | ++ | ++ |
| C-16 | ++ | ++ | ++ | ++ | ++ |
| C-17 | ++ | ++ | ++ | ++ | ++ |
| C-19 | ++ | ++ | ++ | ++ | ++ |
| C-20 | ++ | ++ | ++ | ++ | ++ |
| C-21 | ++ | ++ | ++ | ++ | ++ |
| C-22 | ++ | ++ | ++ | ++ | ++ |
| C-24 | ++ | ++ | ++ | ++ | ++ |
| C-25 | ++ | ++ | ++ | ++ | ++ |
| C-26 | ++ | ++ | ++ | ++ | ++ |
| C-27 | ++ | ++ | ++ | ++ | ++ |
| C-29 | ++ | ++ | ++ | ++ | ++ |
| C-30 | ++ | ++ | ++ | ++ | ++ |
| Comparative example: | | | | | |
| C-1 | — | — | — | — | — |
| C-2 | + | + | — | — | — |
| C-3 | ++ | ++ | + | — | — |
| C-4 | ++ | ++ | + | — | — |
| C-5 | ++ | ++ | + | — | — |
| C-6 | ++ | ++ | + | — | — |
| C-7 | ++ | ++ | ++ | + | — |
| C-8 | — | — | — | — | — |
| C-18 | — | — | — | — | — |

TABLE V-continued

| Dispersing agent | Stability upon standing at 25° C. | | | | |
|---|---|---|---|---|---|
| C-23 | − | − | − | − | − |
| C-28 | − | − | − | − | − |
| The present invention: | 1 day | 20 days | 40 days | 60 days | 80 days |
| C-9:D-1 = 7:3 | ++ | ++ | ++ | ++ | ++ |
| C-9:D-1 = 5:5 | ++ | ++ | ++ | ++ | ++ |
| C-9:D-1 = 3:7 | ++ | ++ | ++ | ++ | ++ |
| C-10:D-1 = 7:3 | ++ | ++ | ++ | ++ | ++ |
| C-10:D-1 = 5:5 | ++ | ++ | ++ | ++ | ++ |
| C-10:D-1 = 3:7 | ++ | ++ | ++ | ++ | ++ |
| C-11:D-1 = 7:3 | ++ | ++ | ++ | ++ | ++ |
| C-11:D-1 = 5:5 | ++ | ++ | ++ | ++ | ++ |
| C-11:D-1 = 3:7 | ++ | ++ | ++ | ++ | ++ |
| C-12:D-1 = 7:3 | ++ | ++ | ++ | ++ | ++ |
| C-12:D-1 = 5:5 | ++ | ++ | ++ | ++ | ++ |
| C-12:D-1 = 3:7 | ++ | ++ | ++ | ++ | ++ |
| C-13:D-2 = 7:3 | ++ | ++ | ++ | ++ | ++ |
| C-13:D-2 = 5:5 | ++ | ++ | ++ | ++ | ++ |
| C-13:D-2 = 3:7 | ++ | ++ | ++ | ++ | ++ |
| C-14:D-2 = 7:3 | ++ | ++ | ++ | ++ | ++ |
| C-14:D-2 = 5:5 | ++ | ++ | ++ | ++ | ++ |
| C-14:D-2 = 3:7 | ++ | ++ | ++ | ++ | ++ |
| C-15:D-2 = 7:3 | ++ | ++ | ++ | ++ | ++ |
| C-15:D-2 = 5:5 | ++ | ++ | ++ | ++ | ++ |
| C-15:D-2 = 3:7 | ++ | ++ | ++ | ++ | ++ |
| C-16:D-2 = 7:3 | ++ | ++ | ++ | ++ | ++ |
| C-16:D-2 = 5:5 | ++ | ++ | ++ | ++ | ++ |
| C-16:D-2 = 3:7 | ++ | ++ | ++ | ++ | ++ |
| C-17:D-3 = 7:3 | ++ | ++ | ++ | ++ | ++ |
| C-17:D-3 = 5:5 | ++ | ++ | ++ | ++ | ++ |
| C-17:D-3 = 3:7 | ++ | ++ | ++ | ++ | ++ |
| C-19:D-3 = 7:3 | ++ | ++ | ++ | ++ | ++ |
| C-19:D-3 = 5:5 | ++ | ++ | ++ | ++ | ++ |
| C-19:D-3 = 3:7 | ++ | ++ | ++ | ++ | ++ |
| C-20:D-3 = 7:3 | ++ | ++ | ++ | ++ | ++ |
| C-20:D-3 = 5:5 | ++ | ++ | ++ | ++ | ++ |
| C-20:D-3 = 3:7 | ++ | ++ | ++ | ++ | ++ |
| C-21:D-4 = 7:3 | ++ | ++ | ++ | ++ | ++ |
| C-21:D-4 = 5:5 | ++ | ++ | ++ | ++ | ++ |
| C-21:D-4 = 3:7 | ++ | ++ | ++ | ++ | ++ |
| C-22:D-4 = 7:3 | ++ | ++ | ++ | ++ | ++ |
| C-22:D-4 = 5:5 | ++ | ++ | ++ | ++ | ++ |
| C-22:D-4 = 3:7 | ++ | ++ | ++ | ++ | ++ |
| C-24:D-4 = 7:3 | ++ | ++ | ++ | ++ | ++ |
| C-24:D-4 = 5:5 | ++ | ++ | ++ | ++ | ++ |
| C-24:D-4 = 3:7 | ++ | ++ | ++ | ++ | ++ |
| C-25:D-1 = 5:5 | ++ | ++ | ++ | ++ | ++ |
| C-25:D-2 = 5:5 | ++ | ++ | ++ | ++ | ++ |
| C-25:D-3 = 5:5 | ++ | ++ | ++ | ++ | ++ |
| C-25:D-4 = 5:5 | ++ | ++ | ++ | ++ | ++ |
| C-26:D-1 = 5:5 | ++ | ++ | ++ | ++ | ++ |
| C-26:D-2 = 5:5 | ++ | ++ | ++ | ++ | ++ |
| C-26:D-3 = 5:5 | ++ | ++ | ++ | ++ | ++ |
| C-26:D-4 = 5:5 | ++ | ++ | ++ | ++ | ++ |
| C-27:D-1 = 5:5 | ++ | ++ | ++ | ++ | ++ |
| C-27:D-2 = 5:5 | ++ | ++ | ++ | ++ | ++ |
| C-27:D-3 = 5:5 | ++ | ++ | ++ | ++ | ++ |
| C-29:D-1 = 5:5 | ++ | ++ | ++ | ++ | ++ |
| C-29:D-2 = 5:5 | ++ | ++ | ++ | ++ | ++ |
| C-29:D-3 = 5:5 | ++ | ++ | ++ | ++ | ++ |
| C-30:D-2 = 5:5 | ++ | ++ | ++ | ++ | ++ |
| C-30:D-3 = 5:5 | ++ | ++ | ++ | ++ | ++ |
| C-30:D-4 = 5:5 | ++ | ++ | ++ | ++ | ++ |
| C-31:D-1 = 5:5 | ++ | ++ | ++ | ++ | ++ |
| C-31:D-2 = 5:5 | ++ | ++ | ++ | ++ | ++ |
| C-31:D-3 = 5:5 | ++ | ++ | ++ | ++ | ++ |
| C-32:D-1 = 5:5 | ++ | ++ | ++ | ++ | ++ |
| C-32:D-2 = 5:5 | ++ | ++ | ++ | ++ | ++ |
| C-32:D-3 = 5:5 | ++ | ++ | ++ | ++ | ++ |
| C-32:D-4 = 5:5 | ++ | ++ | ++ | ++ | ++ |
| Comparative example: | | | | | |
| C-1:D-1 = 5:5 | − | − | − | − | − |
| C-2:D-2 = 5:5 | ++ | − | − | − | − |
| C-3:D-3 = 5:5 | ++ | + | − | − | − |
| C-4:D-4 = 5:5 | ++ | − | − | − | − |
| C-5:D-1 = 5:5 | ++ | − | − | − | − |
| C-6:D-2 = 5:5 | ++ | − | − | − | − |
| C-7:D-3 = 5:5 | ++ | ++ | + | − | − |
| C-8:D-4 = 5:5 | − | − | − | − | − |
| C-18:D-4 = 5:5 | − | − | − | − | − |
| C-23:D-4 = 5:5 | − | − | − | − | − |
| C-28:D-4 = 5:5 | − | − | − | − | − |

The above has been offered for illustrative purposes only, and it is not for the purpose of limiting the scope of this invention which is defined in the claims below.

We claim:

1. In an oily composition comprising a uniform dispersion of insoluble particles in an oil, said dispersion being selected from the group consisting of
   (i) particles of a fluorocarbon resin in a lubricating oil,
   (ii) particles of SiO$_2$ in an oil coating composition, and
   (iii) particles of magnesium hydroxide in bunker oil,
   the improvement wherein said oil contains an amount effective to maintain said particles uniformly dispersed therein of a dispersing agent consisting essentially of a mixture of
   (a) a reaction product of a compound of a molecular weight of at least 1,000 and of the formula:

$$R^1-[(OCH_2CH_2)_x-OH]_y \qquad (I)$$

wherein $R^1$ is an organic bridging group, x is an integer greater than 1, and y is an integer from 2 to 8, and a compound of the formula:

$$R^2-CH\underset{O}{\overset{\diagdown\;\;\diagup}{-\!\!\!-\!\!\!-}}CH_2 \qquad (II)$$

wherein $R^2$ is a $C_6$–$C_{40}$ alkyl or phenyl, the molar ratio of compound (II) to compound (I) being at least 1; and
   (b) a lanolin fatty acid ester.

2. A composition according to claim 1 wherein the dispersion is particles of a fluorocarbon resin in a lubricating oil.

3. A lubricating oil composition of claim 2, wherein said dispersing agent consists of from 10 to 90% by weight of (b).

4. A lubricating oil composition of claim 2, wherein compound (I) has a molecular weight of from 1,000 to 27,000.

5. A lubricating oil composition of claim 2, wherein compound (I) is an adduct of ethylene oxide to an active hydrogen compound selected from the group consisting of a polyol, a polyamine and a trialkanolamine.

6. A lubricating oil composition of claim 2, wherein compound (I) is an adduct of ethylene oxide to ethylene glycol, propylene glycol, glycerine, trimethylolpropane, pentaerythritol, dipentaerythritol, diglycerine, sorbitol or sucrose.

7. A lubricating oil composition of claim 2, wherein compound (I) is an adduct of ethylene oxide to ethylene diamine.

8. A lubricating oil composition of claim 2, wherein compound (I) is an adduct of ethylene oxide to triethanolamine or triisopropanolamine.

9. A lubricating oil composition of claim 2, wherein the molar ratio of compound (I) to compound (II) is 2 to 50.

10. A lubricating oil composition of claim 2, wherein compound (II) is styrene oxide, 1,2-epoxyoctane, 1,2-epoxydecane, 1,2-epoxydodecane, 1,2-epoxyhexadecane, 1,2-epoxyoxtadecane, 1,2-opoxyeicosane, 1,2-epoxytriacontane, or 1,2-epoxytetracontane.

11. A lubricating oil composition of claim 3, wherein (b) is an ester of a fatty alcohol or a polyol.

12. A lubricating oil composition of claim 11, wherein the degree of esterification of (b) is at least 10%.

13. A lubricating oil composition of claim 2 wherein said dispersing agent consists of from 10 to 90% by weight of (b), which is an ester of a fatty alcohol or a polyol having a degree of esterification of at least 10%; wherein compound (I) has a molecular weight of from 1,000 to 27,000 and is an adduct of ethylene oxide to an active hydrogen compound selected from the group consisting of a polyol, a polyamide and a trialkanolamine; wherein the molar ratio of said compound (I) to said compound (II) is 2 to 50; and wherein compound (II) is styrene oxide, 1,2-epoxyoctane, 1,2-epoxydecane, 1,2-epoxydodecane, 1,2-epoxyhexadecane, 1,2-epoxyoxtadecane, 1,2-epoxyeicosane, 1,2-epoxytriacontane, or 1,2-epoxytetracontane.

14. A lubricating oil composition of claim 13, wherein compound (I) is an adduct of ethylene oxide to ethylene glycol, propylene glycol, glycerine, trimethylolpropane, pentaerythritol, dipentaerythritol, diglycerine, sorbitol or sucrose.

15. A lubricating oil composition of claim 13, wherein compound (I) is an adduct of ethylene oxide to ethylene diamine.

16. A lubricating oil composition of claim 13, wherein compound (I) is an adduct of ethylene oxide to triethanolamine or triisopropanolamine.

* * * * *